United States Patent [19]

Shapiro

[11] 4,290,573
[45] Sep. 22, 1981

[54] TWO-PIECE PAPER CUP FOR HOLDING ICE CREAM CONES AND THE LIKE

[75] Inventor: Henry Shapiro, Chicago, Ill.

[73] Assignee: Maryland Cup Corporation, Owings Mills, Md.

[21] Appl. No.: 40,536

[22] Filed: May 21, 1979

[51] Int. Cl.³ ............................................. A47G 23/02
[52] U.S. Cl. ..................................... 248/152; 248/174
[58] Field of Search ................................. 248/152, 174; 229/1.5 H, DIG. 7, 28 R; D7/100; D1/4; 211/72

[56] References Cited

U.S. PATENT DOCUMENTS

| | | | |
|---|---|---|---|
| 1,172,667 | 2/1916 | Bunnell | 248/174 |
| 1,500,611 | 7/1924 | Ewen | 229/1.5 H |
| 1,507,078 | 9/1924 | Mackie | 211/72 UX |
| 1,708,792 | 4/1929 | Huye | 248/174 |
| 1,946,779 | 2/1934 | Conway | 248/174 X |
| 2,556,844 | 6/1951 | Istwan | 229/DIG. 7 |
| 2,567,054 | 9/1951 | Clement et al. | 229/DIG. 7 |
| 2,782,616 | 2/1957 | Eron | 229/1.5 H X |
| 3,561,453 | 2/1971 | Kline | 248/152 X |

FOREIGN PATENT DOCUMENTS 605696 9/1960 Canada ............................. 229/28 R

*Primary Examiner*—J. Franklin Foss
*Attorney, Agent, or Firm*—Birch, Stewart, Kolasch & Birch

[57] ABSTRACT

An ice cream cone holder and display apparatus is formed from a conventional two-piece paper cup. The bottom portion of the cup is specially made to include an arcuate flap through which the ice cream cone is extended to support the cone on a counter. The arcuate flap is formed by an interrupted circular cut substantially centrally located in the bottom portion of the cup. One interruption is of a greater size than the other interruptions and functions as a hinge for the arcuate flap.

5 Claims, 5 Drawing Figures

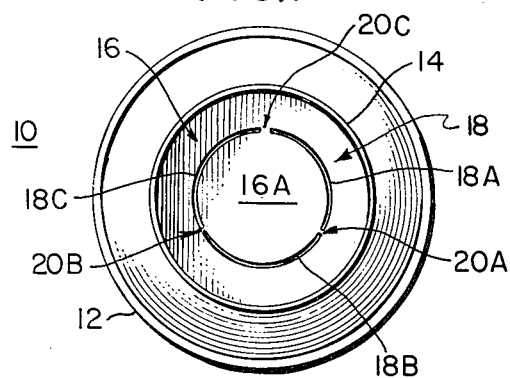
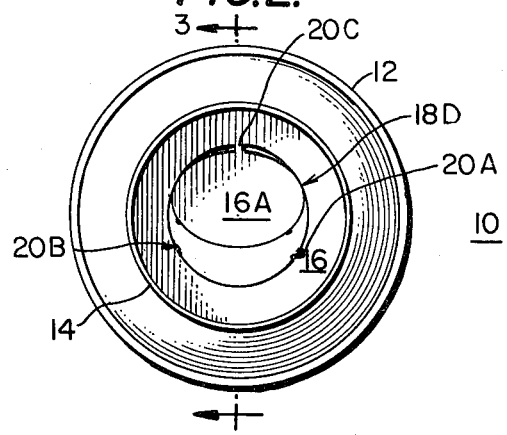
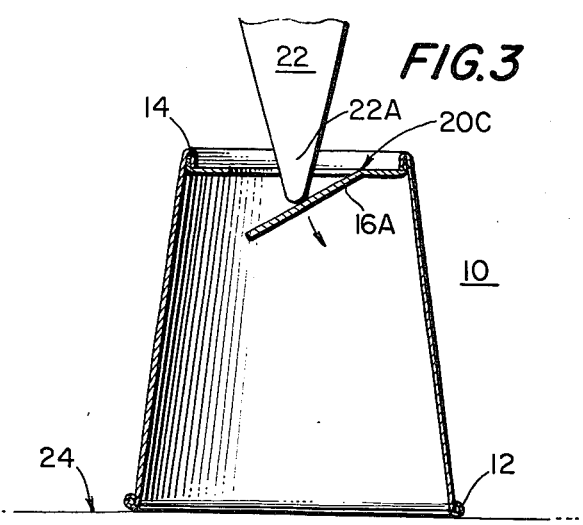
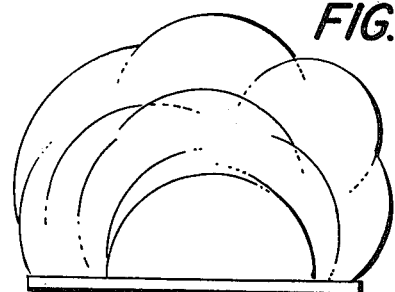
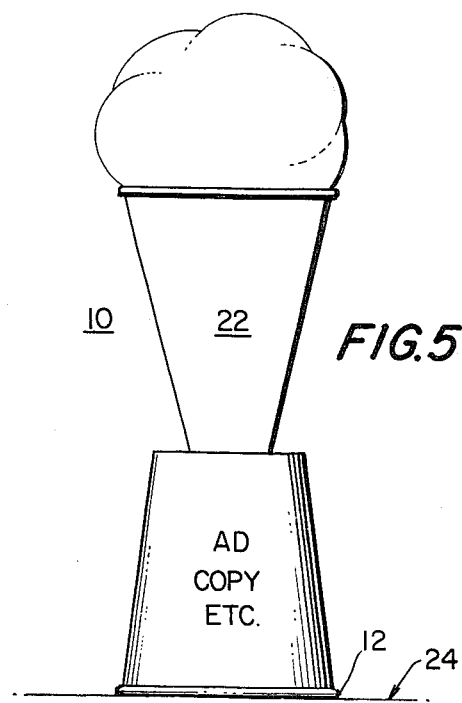
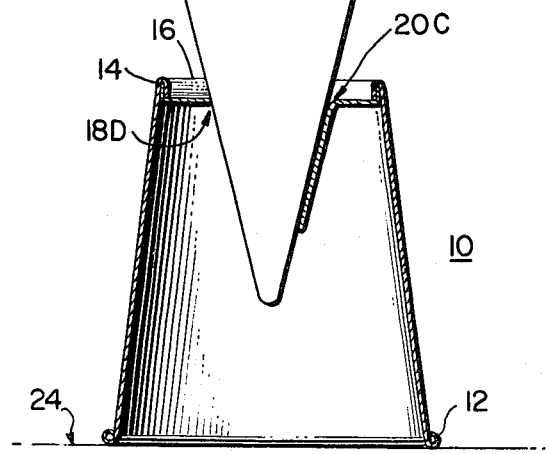

TWO-PIECE PAPER CUP FOR HOLDING ICE CREAM CONES AND THE LIKE

FIELD OF THE INVENTION

This invention relates to means for holding ice cream cones and the like upright on a supporting surface and more particularly, to a two-piece paper cup adapted to this purpose.

BACKGROUND OF THE INVENTION

In serving ice cream cones and the like in fast food establishments numerous types of foods are dispensed and the efficiency with which they are served is critical with respect to maintaining a flow of foods to the customers without undue delay.

The serving of ice cream cones in fast food establishments, particularly of the conventional elongated conical cones rather than truncated self-supporting ice cream cones is most difficult because there has been no practical way heretofore to support the cones on trays or on countertops. Thus, the sale of conventional ones has required hand-holding by and transferring from the hand of a vendor to the hand of a customer such that a substantial time delay is experienced in serving ice cream cones to a large group of customers in conjunction with many other foods ordered by those customers.

It is, therefore, an object of the present invention to provide a novel and facile means for supporting conical ice cream cones on a countertop or customer's tray in a rapid and fool-proof manner.

Another object of the present invention is to provide a new and novel ice cream cone support comprised of a modified two-piece paper cup which has been modified in a manner compatible with the normal manufacturing process for such a cup.

Still another object of the present invention is to provide a new and novel support for ice cream cones and the like which is both sanitary and decorative and which can bear the logo of the establishment serving the ice cream cones.

Yet another object of the present invention is to provide a new and novel ice cream cone supporting structure which is disposable and can be provided at a cost on the order of that for a conventional two-piece paper cup.

These and other objects of the present invention will become more fully apparent with reference to the following specification and drawings which relate to a preferred embodiment of the present invention.

SUMMARY OF THE INVENTION

A conventional two-piece paper cup is formed having a frustoconical shape and which is adapted to be placed in an inverted position to support a filled ice cream cone extending through the bottom portion thereof until that ice cream cone is ready to be consumed by the customer. To achieve this supporting function, the cup bottom blank or disc is provided with a preferably circular, interrupted die cut which would be partially punched out by the point of the ice cream cone after that cone has been filled by the operator. The partially punched die cut is retained within the cup by a resulting hinge formed by the interruption in the cut in the bottom blank.

Basically, any suitable cut which symmetrically supports the ice cream cone within the confines of the bottom of the cup such that the apex of the cone is held away from a supporting surface such as a countertop without causing the supporting structure to tip over would appear to be satisfactory. However, a circular interrupted cut with at least a two-point and preferably a three-point and basically symmetrical interrupted configuration is preferred since the cup bottom blank is cut out and punched prior to assembly. Thus, a three-point suspension for the circular die cut is necessary to permit pneumatic ejection of the finished cup or container from the substantially conventional cup-making machinery and processes. For example, only a single interruption in the die cut would cause the die cut to behave like a flap valve and bypass too much air for effective ejection and conveying of the finished cups away from the cup-making machinery.

BRIEF DESCRIPTION OF THE DRAWINGS

FIG. 1 is a bottom plan view of a cup of the present invention with a circular, interrupted slit formed in the bottom blank thereof;

FIG. 2 is a top plan view of the desired bottom blank configuration with the die cut portion pushed inwardly from the position illustrated in FIG. 1;

FIG. 3 is a cross section of the cup of FIG. 2 taken along line 3—3 thereof and illustrating the initial insertion, in schematic form, of the tip of an ice cream cone through the interrupted circular cut in the bottom portion thereof;

FIG. 4 is the schematic illustration of FIG. 3 with a filled ice cream cone fully inserted into and supported by the inverted cup; and FIG. 5 is a side elevation of FIG. 4 illustrating ad copy and the general aesthetic appearance of the cup and the cone supported thereby as viewed by a customer.

DETAILED DESCRIPTION OF THE DRAWINGS

Referring in detail to the drawings and with particular reference to FIGS. 1 and 2, a container 10 of the present invention is illustrated as including a top curl 12, a bottom curl 14, and a bottom blank 16, the latter being scored or slit in a circular path generally designated as 18 and consisting of three arcuate slits 18A, 18B and 18C separated one from the other, in that order, by interruptions or solid portions 20A, 20B and 20C, respectively.

As can be seen from FIG. 1, the interruptions 20A and 20B are approximately half the size of the interruption 20C such that 20A and 20B are more frangible than the interruption 20C. Therefore, the interruption 20C will not break in response to the pressure applied to the bottom portion 16 at the lesser force required to break the interrupted portions 20A and 20B. As shown in FIG. 2, this permits the interruption 20C to operate as a hinge to retain the flap portion 16A within a substantially cylindrical port 18D in the bottom 16 of the cup 10.

The bottom flap 16A in the cup 10 is adapted to be forced inwardly in the direction of the arrow illustrated in FIG. 3 by placing the apex or lowermost tip 22A of an ice cream cone 22 against the outer surface of the flap 16A and pressing downwardly to thereby fracture the interruptions 20A and 20B leaving a small amount of the material from each attached to both the bottom 16 of the cup 10 and the outer periphery of the flap 16A as generally illustrated in FIG. 2.

As shown in FIGS. 3 and 4, the top curl 12 of the cup 10 is placed downwardly against a supporting surface such as a countertop or tray 24 such that the ice cream cone 22 may have its apex 22A placed against the bottom 16 to thereby force the flap 16A inwardly from the position initially illustrated in FIG. 1, through the position illustrated in FIG. 3 to the ultimate position illustrated in FIG. 4. At the point shown in FIG. 4, the ice cream cone 22 is fully supported by the bottom portion 16 of the cup 10 at the periphery of the opening 18D provided in the bottom 16 by the previous score lines 18 to thereby retain the cone 22 above the supporting surface 24 and in an upright position awaiting ultimate consumption by a customer.

As illustrated in FIG. 5, the ice cream cone 22 after being placed in the inverted cup 10 of the present invention provides an attractive merchandising and display package for a filled ice cream cone which includes, on the cup, ad copy and the like which has been placed there in an inverted position from that ordinarily utilized with regard to the manufacture of paper cups and the like.

The three-point suspension provided by the interruptions 20A, 20B and 20C permits the pneumatic ejection of a finished cup from the machine which is a preferred manner of moving the finished cup from the cup-making equipment into a packaging apparatus or the like.

In a preferred embodiment of the present invention, the order of magnitude of the angle subtended by the interruptions 20A and 20B is on the order of 4° while that of the stronger hinge-like interrupted portion 20C is on the order of 8° on a circle of diameter on the order of $\frac{7}{8}$ inches for the flap 16A. These dimensions are, of course, relative and the actual arcuate length of the resulting hinge 20C is 1/16 of an inch while the arcuate length of the interruptions 20A and 20B is on the order of 1/32 of an inch. The cup itself is a 3 ounce container of two-piece construction but can be of a larger size depending upon the stability and degree of ingestion of the cone into the cup bottom required by a given customer.

Therefore, applicant has provided a new and novel ice cream cone holder and ice cream cone display and vending package by providing a unique paper cup structure to accomplish this purpose while at the same time permitting the structure to be manufactured in accordance with normal manufacturing procedures for two-piece paper cups and the like.

It should be understood that the TWO-PIECE PAPER CUP FOR HOLDING ICE CREAM CONES AND THE LIKE may be modified as would occur to one of ordinary skill in the art without departing from the spirit and scope of the present invention.

It is claimed:

1. An ice cream cone holding and display means comprising:
    a container of frustoconical configuration having a frustoconical sidewall open at one end and closed at its narrowmost end by a closure web; and
    displaceable flap means defined in said closure web by an interrupted circular cut substantially centrally located in said closure web and having at least two interruptions therein;
    one of said interruptions being of a greater extent than the other such that a breaking force applied to said flap means will result in said other of such interruptions being fractured while leaving the first intact;
    said flap means being engageable by the apex of an ice cream cone to apply said breaking force to open a port in said closure web and said closure web, upon displacement of said flap, receiving said cone through said port and engageable with the periphery of said cone intermediate its apex and its open end to support said cone upright in said closure web.

2. The invention of claim 1, wherein said open end of said sidewall is engageable with a supporting surface for providing a surface supported cone holding and display means.

3. The invention of claim 1, wherein said circular cut defining said displaceable flap means includes at least a third interruption of lesser extent than said first interruption.

4. The invention of claim 3, wherein said open end of said sidewall is engageable with a supporting surface for providing a surface supported cone holding and display means.

5. The method of forming an ice cream holder and display means comprising:
    providing a cup bottom blank and defining a displaceable flap therein by a substantially symmetrically located circular cut;
    providing interruptions in said cut of which one is of greater extent than the others;
    forming a frustoconical two-piece cup from said bottom blank and a frustoconical sidewall;
    inverting said formed cup on a supporting surface; and
    applying a breaking force to said displaceable flap to break all but said one interruption to inturn said flap into said inverted cup while hinged by said one interruption to provide a port; and
    inserting an ice cream cone apex first into said port.

* * * * *